(No Model.)

J. KIRBY, Jr.
SIGNAL FOR LOCOMOTIVE HEAD LIGHTS.

No. 276,428.             Patented Apr. 24, 1883.

Witnesses:
Alfred O. Elzner.
J. K. Cady.

Inventor:
John Kirby Jr
By Jeptha Garrard
his atty.

UNITED STATES PATENT OFFICE.

JOHN KIRBY, JR., OF LUDLOW, KENTUCKY, ASSIGNOR TO POST & CO., OF CINCINNATI, OHIO.

SIGNAL FOR LOCOMOTIVE HEAD-LIGHTS.

SPECIFICATION forming part of Letters Patent No. 276,428, dated April 24, 1883.

Application filed February 5, 1883. (No model.)

*To all whom it may concern:*

Be it known that I, JOHN KIRBY, Jr., of Ludlow, Kenton county, Kentucky, have invented a certain new and useful Improvement in Signals for Head-Lights, of which the following is a full, clear, and exact specification, reference being had to the accompanying drawings, forming part of this statement of invention, in which—

Figure 1:
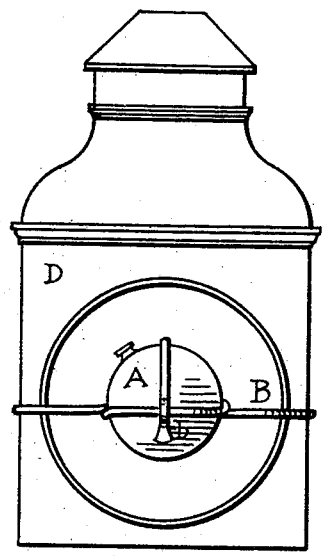
Figure 2:
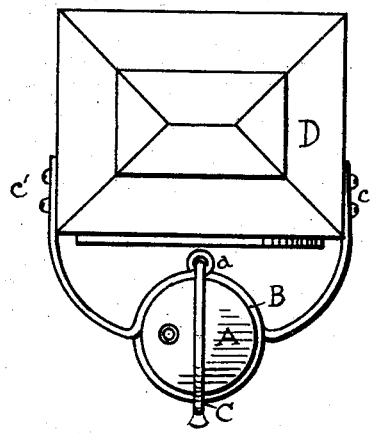

Figure 1 is an elevation of the head-light with globe suspended in front. Fig. 2 is a horizontal plan, looking down.

Similar letters of reference in the several drawings indicate the same parts.

My invention relates to signals for locomotive head-lights, and to the class of signals that are detached from the head-light case, and are illuminated by the lamp of the head-light; and it consists of a glass bulb or ball, A, suspended directly in front of the reflector and outside of the case of a head-light. In the accompanying drawings I have shown a hollow ball of glass filled with a colored liquid; but other forms may be used, either with or without the liquid, and the surface of signal may be cut in facets. This ball may be suspended in any suitable way. One way is shown in the accompanying drawings, where B is a bracket, made of wire or any suitable material, affixed to the case D on both sides at $c$ $c$, and having a loop opposite the center of the reflector-opening in case D. At one side of this loop, at $a$ $a$, bracket C is hinged to bracket B at one end. On the other end it has a spring-clamp, and when in position is secured to the opposite side of B by said clamp, as at $b$. This loop in the bracket B is of a diameter somewhat less than the diameter of the ball to be used as a signal. To suspend the ball, place the signal-ball A in the loop, (its greater diameter will prevent its falling through,) and bring the hinged arm or bracket C over the ball, and secure it to the bracket B.

The object of my invention is to furnish a signal for a locomotive head-light that may be seen from in front and from both sides of a railway-track at the same time.

I am aware that it is not broadly new to locate a signal in front of the head-light of a locomotive in such a manner that it will be illuminated by the direct rays of said light, and do not claim novelty in such, broadly considered.

Having thus described my invention, what I claim, and desire to secure by Letters Patent, is as follows:

The combination, with the head-light of a locomotive, of a signal consisting of a removable glass ball, A, filled with suitable coloring-liquid, and suspended in the rays of the head-light by bracket B and spring-clamp C, substantially as set forth.

The foregoing specification of my invention signed by me this 22d day of January, A. D. 1883.

JOHN KIRBY, JR.

Witnesses:
JEPTHA GARRARD,
RICHARD L. AYER.